J. H. SCOTT.
STERILIZING APPARATUS.
APPLICATION FILED AUG. 21, 1911.
1,019,538.
Patented Mar. 5, 1912.
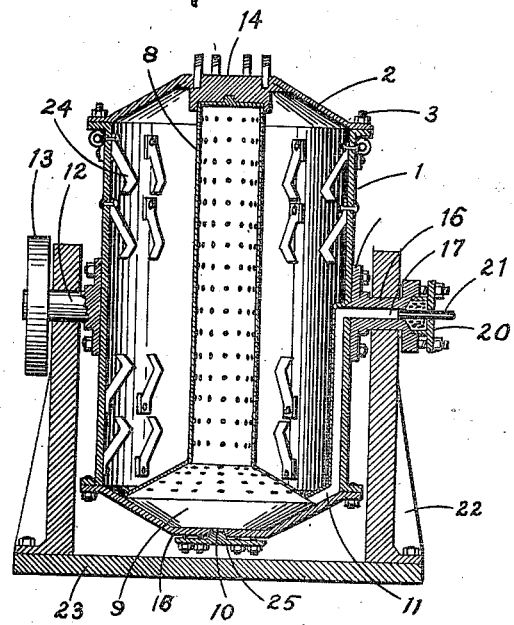
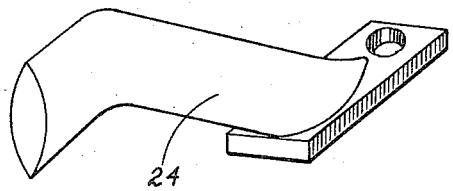
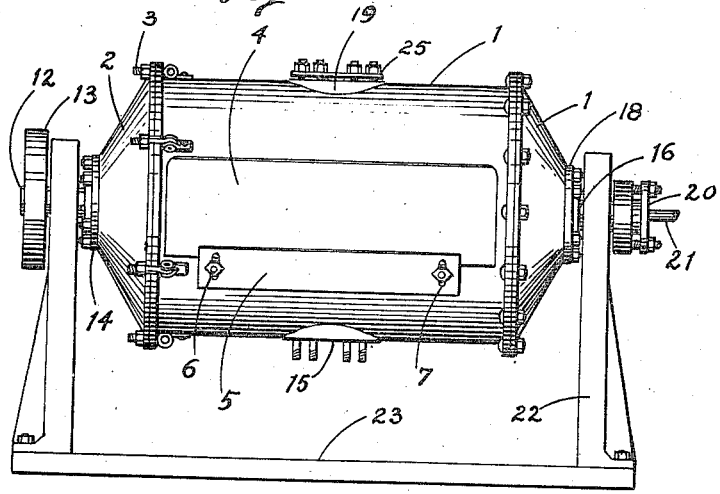
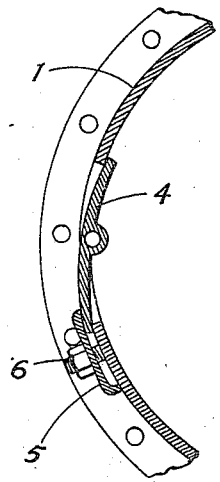
WITNESSES
INVENTOR
James H Scott

UNITED STATES PATENT OFFICE.

JAMES H. SCOTT, OF SAN DIEGO, CALIFORNIA.

STERILIZING APPARATUS.

1,019,538.  Specification of Letters Patent.  Patented Mar. 5, 1912.

Application filed August 21, 1911. Serial No. 645,287.

*To all whom it may concern:*

Be it known that I, JAMES H. SCOTT, a citizen of the United States, residing at San Diego, in the county of San Diego and State of California, have invented a new and useful Sterilizing Apparatus, of which the following is a full, clear, and exact description.

This invention relates to sterilizing apparatus, and its purposes are the provision of an improved apparatus of new and novel construction and arrangement of parts, hereinafter described, adapted to the preparation of a sterilized material from manure, compost, dung, and other like substances, animal and vegetable, which shall be incapable of reproducing weeds or plants of a foreign nature, when used as a fertilizer.

Another purpose is to provide a device for the more thorough mixing of all of the materials which are used in the preparation of a fertilizer, in addition to destroying the life of seeds and the like which may be found therein, and to provide a device in which large quantities of material may be handled in a rapid and expeditious manner.

It is more particularly a device in which a drum having trunnions adapted to be clamped or bolted to the sides or ends thereof, and mounted in adjustable trunnion supports, and having a perforated cylindrical chamber within the interior thereof, is adapted to the introduction of steam and moisture into the substance to be treated for fertilizer, and to the thorough distribution and utilization of the same in cooking, sterilizing, and mixing of the same; the drum being adapted to rotate in either a vertical or a horizontal position in accordance with the position of the trunnions, and being provided with mixing knives secured to the interior walls thereof, for accomplishing the results desired.

These objects and advantages are attained by the particular embodiment of my invention herein described and claimed and illustrated in the accompanying drawings, in which:

Figure 1 is a vertical sectional view of this invention. Fig. 2 is a side elevation of the device mounted in a horizontal position. Fig. 3 is a detail view of a mixing knife. Fig. 4 is a sectional detail view of the pivoted door which covers the side opening in the drum.

Referring more particularly to the drawings in which similar characters of reference are used to designate corresponding parts of the invention, numeral 1 indicates the outer case of the drum, having cover 2, clamped thereto by pivoted bolts 3, the cover being slotted for reception of the bolts. If the device is used in a horizontal position a swing door 4, on the side of the drum will permit emptying of the contents, the door being pivoted on an axis at its center, and having one side close against the inner edge of the opening, and the other side against the outer edge, a clamp 5, holding the door in a closed position. Stud-bolts 6, extend through slots 7, in the clamp, and by loosening the nuts thereon the clamp may be removed from the door.

Within the outer casing and concentric therewith, a chamber having perforated walls, is provided. The end of chamber 8, adjacent to cover 2, being sealed, and the enlarged portion 9, being provided with openings 10 and 11, will allow the admission of steam to the interior in an efficient manner.

Trunnion 12, having driving wheel 13, may be bolted to clamping plates 14, or 15. Trunnion 16, having steam-port 17, in the center thereof, may be bolted to clamping plates 18, or 19. A packing-gland 20, is provided whereby a steam-pipe 21, may be introduced into the port for the admission of steam to the interior of the drum.

Supporting standards 22 are adapted to be bolted to base 23 in different positions, for the horizontal and vertical position of the drum, in accordance with the position of the trunnions thereon.

Two-edged mixing knives 24, on the inside of the drum, are detachable, their object being to cut and mix more thoroughly the contents of the drum.

In operation, the drum is filled with materials which are to be treated for sterilization, the cover is clamped down, or the pivoted door is closed by the clamp provided, in accordance with the position in which the drum is mounted, and steam is admitted to the inside of the drum. The contents are agitated by the rotation of the drum. When sufficiently cooked and mixed, the contents are to be removed. Power may be applied to the drive wheel for rotating the drum. Steam openings 10 and 11, are closed by an additional cover 25, when not covered by the flanged end of the trunnion, cover 25 being clamped by the same stud-bolts which secure the trunnion bearings.

From the foregoing description it will be seen that simple and efficient means are herein provided for accomplishing the objects of the invention, but, while the elements shown and described are well adapted to serve the purposes for which they are intended, it is to be understood that the invention is not limited to the precise construction as set forth, but includes within its purview such changes as may be made within the scope of the appended claims, and such changes as may be made without departing from the spirit of the invention.

I claim as my invention.

1. In a sterilizing apparatus, an outer drum having two-edged mixing knives on the inner side of the wall, and an inner chamber having a perforated wall, the inner chamber being concentric with the outer drum, and adapted to distribute and force live steam throughout the mass of material placed in the outer chamber for sterilization, substantially as shown.

2. In a sterilizing apparatus, a rotatable drum having two sets of clamping faces, and a pair of trunnions adapted to be secured to the drum, one of the trunnions having a driving wheel attached, and the other trunnion having an opening with a gland whereby the trunnion may be rotatably connected to a steam pipe for the admission of steam to the interior of the drum, the trunnions being adapted to be secured to the clamping faces by stud-bolts, whereby the drum may be rotated on its horizontal longitudinal axis, or on its transverse axis, in accordance with the position of the trunnions, substantially as shown.

3. In a sterilizing apparatus, a drum adapted to rotate on a transverse axis or on a longitudinal axis, in accordance with the position of the trunnions thereon, supporting standards in which the trunnions are journaled, and a base on which the standards may be secured in different positions whereby the drum may be mounted to rotate on its transverse or longitudinal axis, in accordance with the position of the trunnion bearings, substantially as shown.

4. In a sterilizing apparatus, a rotatable drum adapted to rotate in different positions, having detachable trunnions and supporting standards therefor, and a clamped cover on the end of the drum and a pivoted cover on the side of the drum, whereby the drum may be opened for the removal of the contents, in accordance with the position in which it is mounted for rotation on its trunnions, substantially as shown.

5. A sterilizing apparatus, comprising a drum having a removable cover on the end thereof and a pivoted door on the side thereof, means for securing the cover and the door, agitating and mixing knives arranged on the interior of the drum, an inner chamber concentric with the longitudinal axis of the drum, having a perforated wall and an enlarged end section, clamping faces arranged on the ends and on the side of the drum, an opening communicating with the inner chamber, on an end clamping face, an opening and a passage communicating with the inner chamber and a side clamping face, a trunnion bearing adapted to be clamped to the drum, having a drive wheel thereon, a trunnion adapted to be clamped to the faces having an opening, the trunnion being provided with a steam port, and a packing gland therefor, supporting standards for the trunnions, and a base to which the supporting standards may be bolted in different positions, whereby the device may be operated by rotating on a transverse axis or on a longitudinal axis, and steam may be admitted to the interior of the drum and inner chamber while the apparatus is operated in either position, substantially as shown and set forth.

In testimony whereof, I affix my signature, in presence of two witnesses.

JAMES H. SCOTT.

Witnesses:
J. W. MASTER,
F. M. KEENEY.